May 1, 1951     S. E. GARUTSO     2,550,685
OPTICAL OBJECTIVE BALANCE ASSEMBLY

Filed Oct. 25, 1945

STEPHEN E. GARUTSO, INVENTOR.

BY William P. Ballard

ATTORNEY.

Patented May 1, 1951

2,550,685

UNITED STATES PATENT OFFICE 2,550,685

OPTICAL OBJECTIVE BALANCE ASSEMBLY

Stephen E. Garutso, San Fernando, Calif., assignor to Garutso, Inc., a corporation of Delaware Application October 25, 1945, Serial No. 624,501

5 Claims. (Cl. 88—57)

My invention relates to optical lenses. It is particularly useful in photography for still and motion pictures and in television but is useful also wherever perspective and accuracy in image production by lenses are important.

The objects of my invention are greatly to increase the depth of focus in lens structures, to improve the clearness of definition, and to enhance the three-dimensional or stereoscopic effect, as compared to that obtained with lenses in use prior to my invention. These results can be realized either by the addition of specially constructed lens elements to known objective lenses or by lens assemblies of entirely new composition. The objects are attained by means of the lens constructions described below.

With an objective lens such as is now commonly used in the taking of motion pictures thirty-two feet is referred to as optical infinity because the lens must be focused to that distance in order to bring into focus objects located between that distance and infinity. Nearer objects are then out of focus. On the other hand such a lens of say three inch focal length, if focused to seven feet with an aperture of f/3.5 will have a depth of focus of only three or four feet and all objects nearer or more remote will be blurred. By following the principle of my invention however lenses have been made which, with a wide open diaphragm, will give sharp images simultaneously of objects from forty inches on to optical infinity and the horizon. This is accomplished without creating double images, distortion, or fuzziness and with a marked three-dimensional effect much more striking than heretofore observed in one-lens pictures. I have called the special lens elements responsible for these results balancing elements and the lens assemblies into which they are built have been called balanced three-dimensional or stereo-plastic lens structures.

For a fuller understanding of my invention reference is made to the accompanying drawings in which Fig. 1 shows a side view of one of the balancing elements.

Figure 1:
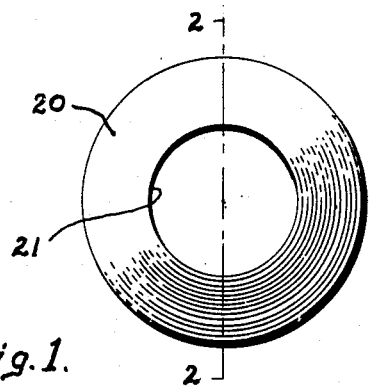
Figure 2:
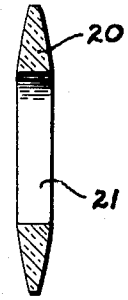
Fig. 2 is a medial section on the line 2—2 of Figure 1.

The balancing element, as shown in Figures 1 and 2 consists essentially of a lens of any suitable transparent and refractive material having an outer or peripheral refractive zone and a central non-refractive zone preferably consisting of an opening. The diameter of the element, the diameter of the opening, the refractive power of the outer zone, and the spacing of the elements in the lens assembly will depend upon the circumstances of the use of the balancing elements as hereinafter indicated.

Figure 3:
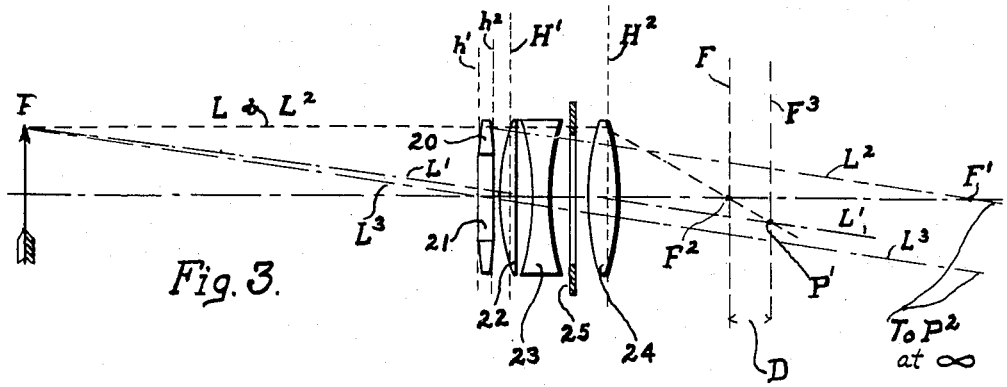
Fig. 3 is a diagram illustrating the optical effect of applying a balancing element to an objective lens assembly of a known type.

Fig. 3 shows such a balancing element combined with a conventional lens system of known type. The balancing element is shown at 20, and the conventional lens system comprises the lens elements 22, 23, and 24 and a diaphragm 25. The objects to be viewed or photographed are to the left and the screen or photographic plate is at the right. $H^1$ and $H^2$ indicate the principal planes of the conventional assembly for the purposes of the diagram, and $h^1$ and $h^2$ indicate the corresponding principal planes of the balancing element.

F is the focal plane upon which an image would be formed by the conventional or unbalanced assembly alone for objects at a distance of infinity. $F^3$ indicates the plane upon which the conventional or unbalanced assembly alone would produce an image of an object at P (arrow) which may be taken to be at say forty inches from the lens. This is indicated by the convergence of the rays $L^1$ and L passing from the point P through the optical center and the outer parts of the lens respectively. (Space limitations make it impossible to show the distances in correct proportion.) If then the conventional assembly is focused on optical infinity, images of objects at that distance will be properly in focus on the plane F. The image of the object P at forty inches, however, will be badly out of focus on that plane, as indicated by the difference D in focal distance between that plane and the point $P^1$ which represents the conjugate focus of P for that objective lens.

If we consider the effect of the balancing element alone (i. e., assuming the other lens elements are removed) it will be apparent that the path of a ray from the point P passing through the opening at the optical center will be as indicated at $L^3$. With a properly selected refractive power for the balancing element, the light ray $L^2$ passing from point P through the body of the element will strike a point $F^1$ on the principal axis such that the ray will then be parallel to the ray $L^3$ passing through the optical center, as indicated on the drawing. Since these rays are parallel the image $P^2$ of the object P due to such rays would be at infinity.

If now the balancing element and the conventional assembly are used together the image of P at infinity formed by the balancing element will serve as a theoretical object for the unbalanced assembly and the final image of P will be formed on the plane $F'$ instead of on the plane $F^3$; that is the final image is moved, by reason of the balancing element, through the distance D as shown in Fig. 3.

By virtue of the effect just described, if the unbalanced objective and the balancing element are used together, the assembly may be focused for optical infinity and still give good focus for objects located at P and beyond and the images will all fall on the same plane.

In the foregoing reference to Fig. 3 I have endeavored to explain the theory underlying the results I have attained by referring to the simple case of a single balancing element, and use of a single element will give improved results over other known arrangements. I have discovered however that greatly improved results are obtained—both as respects universality of focus and three-dimensional effect—if a plurality of properly related balancing elements are used and spaced along the optical axis. The various balancing elements should have outside diameters approximating those of the conventional lens elements to which they are respectively adjacent so as to pass the same beam of light rays and the central openings or non-refractive zones should in general be different for the different elements. In such an arrangement the set of balancing elements as a whole will produce the greatest effect on the outer fringe of rays passing through the assembly (which are the ones causing the greatest out-of-focus effects) while the rays are affected less and less by the group of balancing elements as we move toward the center of the beam.

Figure 4:
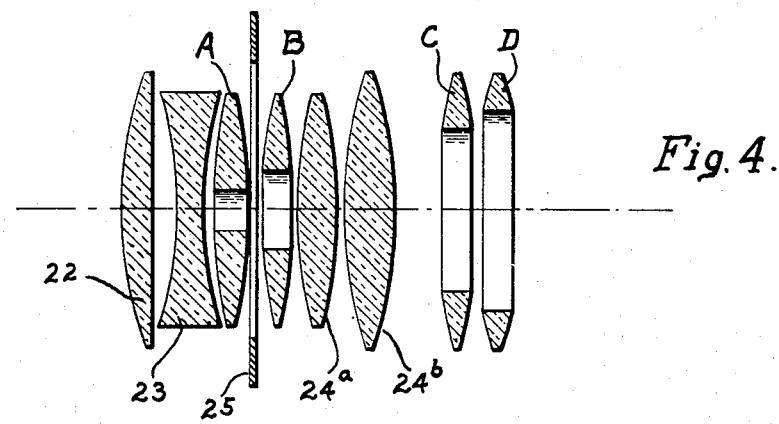
Fig. 4 is a diagram of a lens assembly illustrating the use of four balancing elements.

Fig. 4 illustrates an assembly embodying four balancing elements in an arrangement that has been found to give excellent results and which may be regarded as typical of various modifications that have been successfully used in the taking of motion pictures.

In Fig. 4, reference characters 22, 23, 24a and 24b indicate the lens elements, and 25 the diaphragm, of a known type of compound lens used for photography. With this objective lens I have combined four balancing elements shown at A, B, C, and D. A is shown immediately in front of the diaphragm and back of the dispersion element 23. B is immediately behind the diaphragm and in front of the lens element 24a. C and D are near each other and a short distance back of the lens element 24b. All of these balancing lenses individually are of comparatively small refractive power. A has a relatively small axial opening—of the order of an eighth of its diameter. The openings in B, C, and D are progressively larger, that in D being about three fourths of its diameter. The order and position of the several balancing elements with respect to each other and with relation to the other lens units of the objective may be varied considerably without substantial sacrifice of results. The balancing element or elements may be in front of the conventional lens as indicated in Figure 3 or may be otherwise distributed with respect to the elements of the conventional lens as indicated in Figure 4. The number of balancing elements and their refractive power are not critical and will depend upon the range or depth of focus to be attained, and the distribution of the total refractive power among the several elements is variable without sacrifice of results. The outside diameter of the balancing elements approximates the diameter of the conventional lens and should encompass the cone of image rays entering or leaving the latter. The inside diameters of the balancing elements should also be related to the diameter of the active cone of rays at the points where they are located. When fitting balancing elements to a particular conventional lens for the first time it will usually be necessary to test for the optimum inside diameters of these elements at the locations chosen for them, much as an oculist fits spectacles to a patient's eyes. If the inside diameter is just slightly too small the test will show some aberration; if somewhat smaller still double images appear; and if much too small the focal length of the conventional lens is altered. If the inside diameter is made progressively larger than optimum the nearer objects will become progressively out of good focus.

As a further assistance to others in the construction of lens assemblies in accordance with my invention, I will now give exact specifications for a specific case of such an assembly as illustrated in Fig. 4. A commercial Cooke cinema lens, 47m/m,f-2.5, obtainable on the market, has lens elements corresponding in structure to the elements 22, 23, 24a and 24b as shown in Fig. 4, and a diaphragm located as indicated at 25 of that figure. The lens elements 22 and 24b are twenty millimeters in diameter and the elements 23 and 24a are seventeen millimeters in diameter. Excellent results of the character above described will be obtained if there is added to this Cooke lens, four balancing elements in the positions indicated at A, B, C, and D, and with outside diameters equal respectively to those of the Cooke lens elements which they severally adjoin, and with inside diameters (openings), index of refraction, and curvatures respectively as follows:

| Balancing element | Inside diameter | Curvature | Index of refraction |
|---|---|---|---|
| A | 2 m/m | +0.25 | 1.523 |
| B | 7 m/m | +0.25 | 1.523 |
| C | 12 m/m | +0.25 | 1.523 |
| D | 15 m/m | +0.50 | 1.523 |

Balancing elements A and B are as close to the Cooke elements 23 and 24a respectively as possible without mechanical interference. Balancing elements C and D are similarly close to each other and spaced from the axial center of the near side of the Cooke element 24b by about one millimeter. Each of the balancing elements has a maximum thickness of approximately one millimeter. Outside diameters of lenses given in this example are the working diameters.

I am aware that numerous attempts have heretofore been made to attain simultaneous focus on a single plane of objects at widely different distances, and to produce an effect of three-dimensionality—as shown for example by British Patent 335,696 of 1930. These efforts have all failed, as I believe, because they made use of what amounts to separate individual lenses for the various distances, each focused on, or constructed to have a focal length for, a certain distance. I have found from my own experience with such arrangements that they inevitably produce double images, some of which may be individually sharp but which as a whole cause distortion and an unpleasant sensation of fuzziness when viewed in the resulting picture, and such results have not been acceptable commercially. The balanced lens of my invention avoids these defects and gives a strong impression of roundness in the pictures, and the results have been proved highly acceptable for commercial purposes.

While I have, for purposes of illustration, shown my invention as embodied in a photographic lens of the type used in motion picture photography, it is to be understood that this does not imply any limitation on the uses of the invention or the structures in which it may be embodied.

This application is a continuation in part of my application Serial Number 581,382 filed March 7, 1945, now abandoned.

What I claim as my invention and desire to secure by Letters Patent is:

1. In combination with a photographic objective of the type having a plurality of axially spaced elements including a front collecting lens, a dispersing lens positioned rearwardly of said front lens, and at least one collecting lens positioned rearwardly of said dispersing lens, a focal depth increasing element comprising: an annular collecting lens positioned between said dispersing lens and said rearward collecting lens, the internal diameter of said annular lens being less than the minimum diameter of the cone of light passed by said objective whereby a peripheral zone of said cone passes through said annular lens.

2. The construction set forth in claim 1 further characterized by having a diaphragm stop positioned between said first annular lens and said rearward lens, and a second annular lens between said diaphragm stop and said rearward lens, said second annular lens having an internal diameter less than the diameter of said cone of light at the point where said cone passes through said second annular lens.

3. The construction of claim 2 further characterized in that said second annular lens is greater in internal diameter than said first annular lens.

4. In combination with a photographic objective of the type having a plurality of axially spaced elements including a front collecting lens, a dispersing lens positioned rearwardly of said front lens, and at least one collecting lens positioned rearwardly of said dispersing lens, focal depth increasing elements comprising: a plurality of annular collecting lenses positioned between said dispersing lens and said rearward collecting lens, the internal diameters of said annular lenses being less than the minimum diameter of the cone of light passed by said objective whereby a peripheral zone of said cone passes through said annular lenses.

5. In combination with a photographic objective of the type having a plurality of axially spaced elements including a front collecting lens, a dispersing lens positioned rearwardly of said front lens, and at least one collecting lens positioned rearwardly of said dispersing lens, focal depth increasing elements comprising: a plurality of annular collecting lenses positioned between said dispersing lens and said rearward collecting lens, the internal diameters of said annular lenses being different from each other and each being less than the minimum diameter of the cone of light passed by said objective whereby different peripheral zones of said cone pass through said annular lenses.

STEPHEN E. GARUTSO.

REFERENCES CITED

The following references are of record in the file of this patent:

UNITED STATES PATENTS

| Number | Name | Date |
|---|---|---|
| 1,154,232 | Byron | Sept. 21, 1915 |
| 1,169,731 | Mengel | Jan. 25, 1916 |
| 1,446,634 | Bell et al. | Feb. 27, 1923 |
| 1,627,892 | Frederick | May 10, 1927 |
| 1,954,755 | Heine | Apr. 10, 1934 |
| 1,979,159 | Howser | Oct. 30, 1934 |
| 2,004,806 | Ellestad | June 11, 1935 |

FOREIGN PATENTS

| Number | Country | Date |
|---|---|---|
| 193,969 | Great Britain | Mar. 2, 1923 |
| 373,755 | Germany | Apr. 16, 1923 |
| 622,100 | France | Feb. 19, 1927 |
| 335,696 | Great Britain | Oct. 2, 1930 |
| 723,996 | France | Jan. 23, 1932 |